United States Patent Office 3,315,103
Patented Apr. 18, 1967

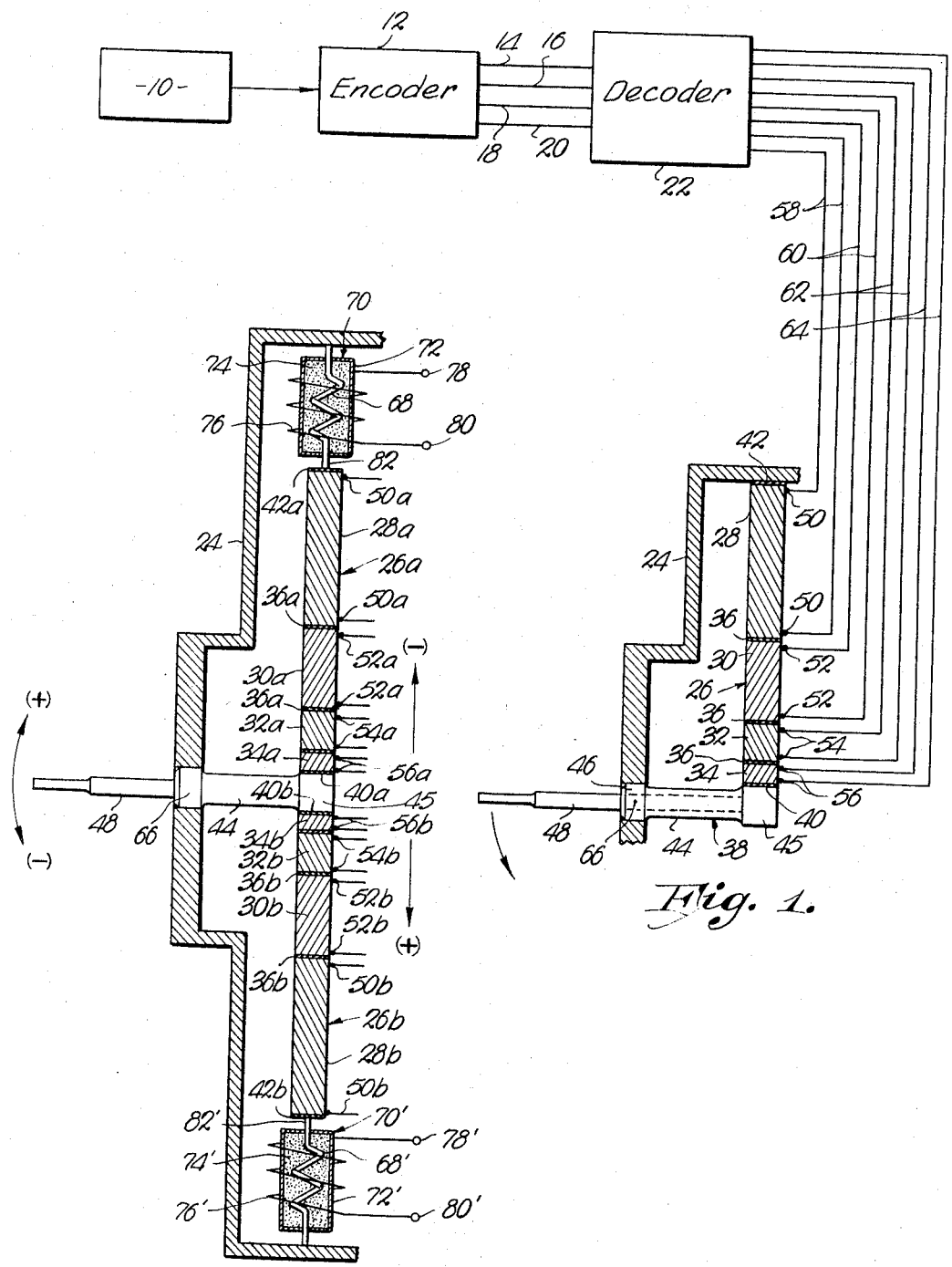

3,315,103
DIGITAL TORQUE MOTOR
Billy E. Duff, Kellyville, and Rex D. Hughes, Tulsa, Okla., assignors to Midwestern Instruments, Inc., Tulsa, Okla., a corporation of Oklahoma
Filed Jan. 10, 1964, Ser. No. 336,973
10 Claims. (Cl. 310—8.1)

This invention relates to a digital torque motor employing an electrostrictive substance to actuate the output shaft of the motor.

In the field of torque motors and electromechanical actuators, it is frequently desired to produce a variable mechanical output in accordance with digital input commands to the actuator. Heretofore, such a control arrangement has necessitated the employment of digital-to-analog conversion prior to introduction of the command signal into the torque motor. Alternatively, a system frequently used heretofore has utilized a plurality of torque motors or other electromechanical actuators, each being arranged to respond to a particular digital signal. In this manner, the cumulative effect of the various actuators is to produce a mechanical displacement in accordance with the digital command. Manifestly, neither of these arrangements initiates a mechanical displacement in response to a digital command through the use of a single actuator unit free from the additional circuitry necessary for digital-to-analog conversion.

It is, therefore, the primary object of this invention to provide an electromechanical actuator capable of responding directly to digital commands.

Another important object of this invention is to provide a torque motor or electromechanical actuator that utilizes an electrostrictive substance to effect mechanical displacement of the actuator output shaft.

Another object of this invention is to provide an electromechanical actuator having an output shaft which is normally in a null position but which is movable in either of at least two directions away from said null position in response to the contraction of an electrostrictive substance within the actuator.

Still another object of this invention is to provide apparatus for converting digital signals directly into a mechanical displacement and to effect such conversion through the use of electrostrictive elements, each of which contracts an amount corresponding to the relative digital value of the control signal applied thereto.

Yet another object of this invention is to provide an electrostrictive control motor having advantages of size, weight, response time, low hysteresis and insusceptibility to lateral acceleration.

Other objects will become apparent as the detailed description proceeds.

In the drawing:

FIGURE 1 is a diagrammatic view showing a digital command system coupled with a simplified version of the instant invention; and FIG. 2 is a diagrammatic view of the instant invention showing structure for effecting both positive and negative displacement of the output shaft.

Referring to the figures, the numeral 10 denotes a source of digital information such as a computer, tape deck, automatic pilot, or the like. The output from source 10 is fed to an encoder 12 for conversion into an appropriate code. Encoders are well known and widely used in the art, an example thereof being tape reader electronics of a digital tape transport.

After conversion into an appropriate code, such code being of the 4-bit binary type in the instant example, the intelligence leaves the encoder 12 along leads 14, 16, 18 and 20 which are coupled with a decoder 22. The function of the decoder is to convert the binary coded intelligence into electrical signals for use by the instant invention in a manner to be described hereinafter. After the details of this invention are set forth, it will become evident that the construction and design of a suitable decoder 22 is well within the skill of the art. Therefore, further details concerning the decoder will not be dealt with in this specification.

The numeral 24 denotes a housing for the components of the apparatus of the instant invention. Housing 24 is revealed in a diagrammatic, fragmentary form. Referring to FIG. 1, it may be seen that an electrostrictive strip or member 26 is disposed within housing 24 and comprises four electrostrictive pads or elements 28, 30, 32 and 34.

The pads 28–34 are electrically insulated from one another by layers of insulating material illustrated at 36. Pad 34 is rigidly coupled with shiftable output structure generally designated 38, structure 38 and pad 34 being separated by insulation layer 40. The end of pad 28 remote from structure 38 is rigidly secured to housing 24, the interconnection of pad 28 and housing 24 also being effected by an insulation layer 42. It should be understood that the insulation layers 36, 40 and 42 may comprise any suitable electrically nonconductive material capable of forming a rigid mechanical interconnection between the various components. For example, a thermosetting epoxy resin may be employed.

Structure 38 comprises a flexure tube 44 having an enlargement 46 on the end thereof remote from member 26, enlargement 46 being inserted into a mating opening in housing 24 to seal the internal components of the apparatus within the housing. This may be accomplished, for example, by a press-fit or through the use of a suitable sealant around enlargement 46. An output shaft 48 extends axially through tube 44 and is joined to a block 45 rigid with the end of the tube.

Before the operation of the apparaus shown in FIG. 1 is discussed, it is instructive to first note certain characteristics of the electrostrictive pads 28–34. These pads are preferably composed of an electrostrictive metal. Various electrostrictive metals have been recently developed which are relatively insensitive to ambient temperature variations, unlike the crystalline electrostrictive materials that have been in use for a number of years that required a constant temperature for operation. These metals shrink or contract a predetermined amount upon application of a constant electrical potential thereto. In general, the degree of shrinkage is proportional to the value of the electric current flowing in the metal. Since in the instant invention we are concerned with digital commands, it is evident that the voltage level of the commands will be constant. Therefore, the sizes of the electrostrictive pads 28–34 are different in order that the digital-to-analog conversion may be directly effected.

To explain more fully, pad 28 may, for example, be constructed so as to contract 0.008 inch upon energization thereof by an electrical signal of the digital voltage level. Continuing, pads 30, 32 and 34 may be constructed so as to contract 0.004, 0.002, and 0.001 inch, respectively. It is evident, therefore, that the amount of contraction of each of the pads is selected so that a total contraction of member 26 may be obtained of 0.015 inch in steps of 0.001 inch.

In the operation of the apparatus shown in FIG. 1, decoder 22 routes the appropriate digital command from the output of encoder 12 to the corresponding electrostrictive pad of the electromechanical actuator. In other words, assuming for purposes of illustration that the intelligence contained in the encoder output is in the 1, 2, 4, 8 code, decoder 22 routes the "8" signal to pad 28 if such a signal is present. Similarly, "1," "2," or "4" commands from the encoder output are routed to pads 34, 32 or 30, respectively.

Electrical connections to the various pads are effected by terminal pairs adjacent opposed ends of each pad. Pad 28 is provided with terminals 50, pad 30 is provided with terminals 52, pad 32 contains terminals 54, and pad 34 is provided with terminals 56. Conductor pairs 58, 60, 62 and 64 interconnect the decoder output with terminal pairs 50, 52, 54 and 56, respectively.

The various electrostrictive pads are constructed so as to contract in directions parallel with the direction of current flow therethrough. Therefore, since all of the pads are mechanically interconnected and pad 28 is rigid with housing 24, energization of any or all of the pads by decoder 22 effects shrinkage of member 26 toward its interconnection with the housing and pulls flexure tube 44 therewith. This effects rotation of shaft 48 in a counterclockwise direction as illustrated by the arrow. Upon de-energization of the pads, the latter return to their normal dimensions and are assisted by the returning force of flexure tube 44. Tube 44 thus also serves as a centering force on shaft 48 to return the shaft to the null position. It should be noted that the external diameter of shaft 48 is less than the internal diameter of tube 44, permitting swinging of the shaft about a pivot point illustrated approximately at 66.

Referring now to FIG. 2, an electromechanical actuator or torque motor is shown capable of swinging its output shaft 48 in either a positive or negative direction from the null or center position. The structure shown in FIG. 2 is identical with that as illustrated in FIG. 1 with the addition of certain components to achieve the dual direction function. Two members 26a and 26b are employed, each of the members being rigid with opposed sides of block 45 and extending therefrom in opposite directions. Insulating layer 42a at the end of pad 28a remote from block 45 is rigidly joined with a spring 68. Spring 68 is secured to housing 24 to thus provide a suspension for member 26a. Spring 68 is surrounded by a powdered metal clutch 70, the latter comprising a case or cylinder 72 filled with a powder 74 composed of ferromagnetic metal particles. A coil 76 surrounds case 72 and is electrically connected with terminals 78 and 80.

In like manner, the insulating layer 42b at the end of member 26b remote from block 45 is connected with a spring 68' rigid with housing 24. The entire mechanism is thus yieldably suspended within the housing. Spring 68' is surrounded by a powdered metal clutch 70' of identical description as above described for clutch 70. The powder 74 and 74' in the clutches is preferably composed of metal particles having a high nickel content. This decreases the magnetic retentivity of the powder to facilitate rapid operation of the clutch. It should be understood that each of the springs 68 and 68' is free to attenuate and compress when the clutch is disengaged, the stems 82 and 82' of respective springs 68 and 68' being received by openings in the associated cases 72 and 72' permitting the stems to reciprocate during operation of the springs.

The apparatus of FIG. 2 is, of course, intended for use in applications where it is desired that the mechanism to be actuated may be mechanically displaced in opposed directions from a null position. The digital command circuitry driving the apparatus of FIG. 2 must, therefore, also contain intelligence which directs the system to advance the shaft in the desired direction. Thus, for use with the FIG. 2 apparatus, the encoder 12 and decoder 22 would need an additional information channel along with circuitry responsive to this direction channel to energize the appropriate member and clutch. This will become clear as the operation proceeds.

Swinging of shaft 48 in the direction indicated as positive is accomplished by energizing appropriate pads 28b–34b of member 26b, and energizing coil 76' by application of an electrical signal to terminals 78' and 80'. This causes coil 76' to magnetize powder 74', thereby rigidly locking spring 68' in its normal position as shown. Thus, member 26b is now rigidly secured to housing 24 permitting the contracting force thereof to pull block 45 on the end of flexure tube 44 downwardly as viewed in the drawing. Manifestly, this swings shaft 48 in the clockwise or positive direction as indicated by the arrow.

During operation of the apparatus for positive displacements, spring 68 coupled with member 26a attenuates to thereby permit member 26a to shift downwardly under the contracting force of electrostrictive member 26b. The same principles of digital-to-analog conversion discussed above for the FIG. 1 embodiment are employed in the apparatus of FIG. 2, it being evident to those skilled in the art that the various terminal pairs of the respective pads may be coupled with the appropriate decoder output.

This procedure is reversed when negative step displacements are desired. Coil 76' remains in its normal de-eenrgized state, while coil 76 and the appropriate pads 28a–34a of member 26a are energized. Changing from a negative to a positive displacement therefore, requires that the decoder output route the digital command signals to a different electrostrictive member and simultaneously energize the corresponding clutch.

Shaft 48 may be coupled with any of a variety of external apparatuses of the type subject to control by torque motors or electromechanical actuators. Furthermore, it is evident that the teachings of the instant invention are equally applicable to larger actuator units than usually contemplated in torque motor applications. Additionally, the direct digital-to-analog conversion feature of the instant invention lends the latter to a variety of uses in servomechanisms and automatic controls.

Having thus described the invention, what is claimed as new and desired to be secured by Letters Patent is:

1. In a control:
    support means;
    shiftable structure spaced from the support means and adapted for coupling with apparatus to be mechanically actuated; and
    a member coupled with said support means and said structure for moving the latter toward and away from the support means, said member comprising a series of mechanically interconnected, electrostrictive elements disposed between the structure and said support means, each of the elements being adapted to have an electrical control signal applied thereto and being constructed and arranged to cause contraction of the member and pull the structure toward the support means upon application of said signal thereto, whereby said structure may be selectively shifted to any one of a plurality of desired positions.

2. The invention of claim 1, wherein said member is rigid with the support means and the structure during said contraction of the member.

3. The invention of claim 1, wherein said member includes means electrically insulating said elements from one another.

4. Apparatus for converting digital intelligence into a mechanical displacement including:
    means for producing a plurality of electrical signals defining said digital intelligence;
    support means;
    shiftable structure spaced from the support means;
    a member coupled with said support means and said structure for moving the latter toward and away from the support means, said member comprising a series of mechanically interconnected, electrostrictive elements disposed between the structure and said support means, each of the elements being constructed and arranged to cause contraction of the member and pull the structure toward the support means upon electrical energization thereof; and circuit means operably coupling said elements with said signal-producing means for applying each of said signals to a corresponding element, whereby said structure is shifted to a position corresponding to a particular digital command.

5. The invention of claim 4, wherein each of said elements is of predetermined physical dimensions rendering the element operable to shift the structure toward the support means a distance corresponding to the relative digital value of the respective signal upon application of the latter thereto.

6. The invention of claim 4, wherein said member is rigid with the support means and the structure during said contraction of the member.

7. The invention of claim 4, wherein said member includes means electrically insulating said elements from one another.

8. In a control:
a pair of spaced supports;
shiftable structure between the supports and adapted for coupling with apparatus to be mechanically actuated;
first and second electrostrictive members rigid with the structure and adapted to be coupled with a source of electrical energy for selectively exciting said members; and
first and second suspension means mounting said first and second members, respectively, to a corresponding support and normally yieldably suspending the members between the supports, each suspension means including an electrically responsive clutch operable to rigidly secure the associated member to the corresponding support upon energization thereof, whereby application of said energy to the first member when the clutch of the first suspension means is energized moves the structure in one direction, and application of said energy to the second member when the clutch of the second suspension means is energized moves the structure in a different direction.

9. The invention of claim 8, wherein said members extend from said structure in opposed direction.

10. The invention of claim 8, wherein each of said members comprises a series of mechanically interconnected, electrostrictive elements disposed between the structure and the respective suspension means, each of said elements being adapted to have an electrical control signal applied thereto and being constructed and arranged to cause contraction of its member and pull the structure toward the associated support upon application of said signal thereto when the corresponding clutch is energized.

References Cited by the Examiner

UNITED STATES PATENTS

| 2,867,701 | 1/1959 | Thruston | 301—8.6 |
| 3,153,229 | 10/1964 | Roberts | 310—9.8 |
| 3,154,700 | 10/1964 | McNaney | 310—8.3 |

MILTON O. HIRSHFIELD, *Primary Examiner.*

J. D. MILLER, *Assistant Examiner.*